United States Patent Office 2,915,507
Patented Dec. 1, 1959

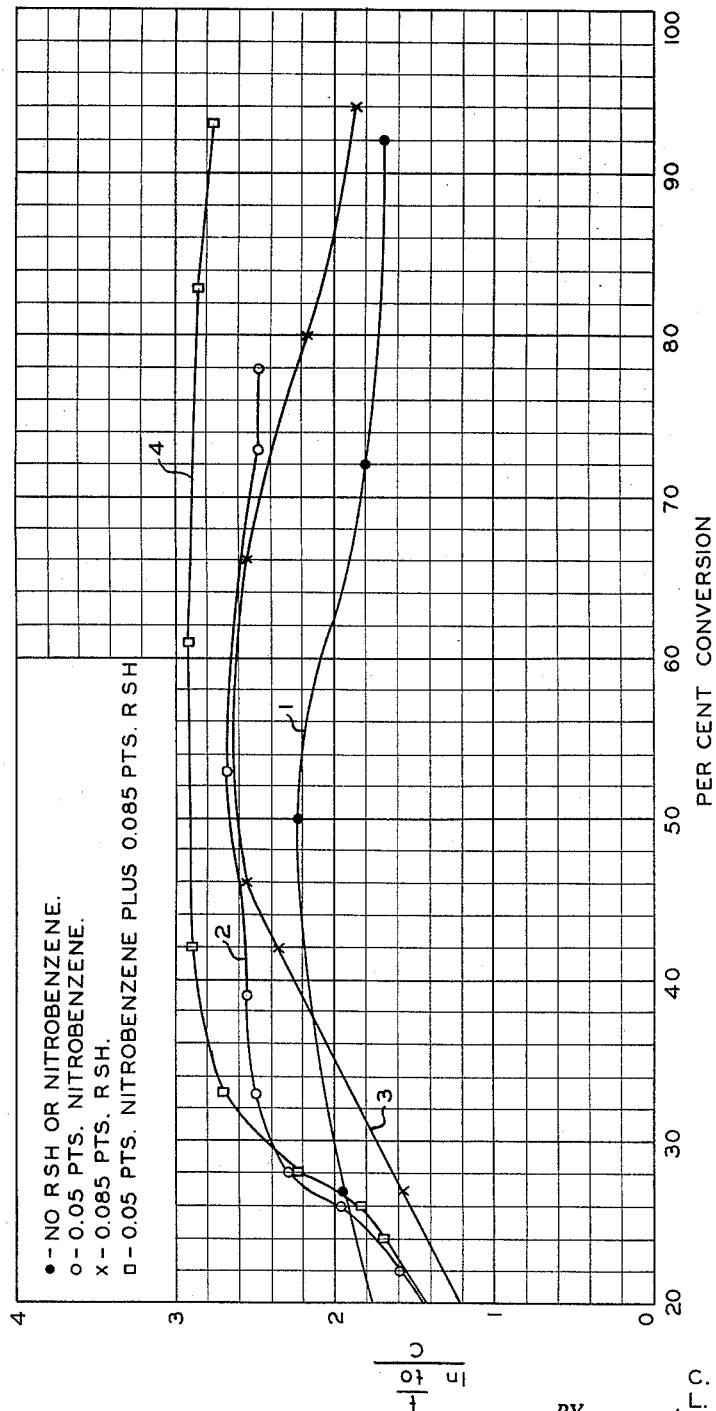

2,915,507

PROCESS OF POLYMERIZING DIENES IN THE PRESENCE OF BOTH A MERCAPTAN AND A NITRO AROMATIC COMPOUND

Carl A. Uraneck, Phillips, and Lesher A. Mitchell, Borger, Tex., assignors to Phillips Petroleum Company, a corporation of Delaware Application April 18, 1955, Serial No. 501,884

10 Claims. (Cl. 260—84.1)

This invention relates to an improvement in the method of polymerizing conjugated dienes. In one of its aspects, this invention relates to a method of producing polymers of essentially constant inherent viscosity from 30 percent conversion to approximately quantitative conversion. In another aspect, this invention relates to a method of producing polymers having essentially constant inherent viscosity throughout the conversion range above 30 percent conversion and being relatively gel free.

It is known that conjugated dienes can be polymerized either alone, with each other, or with other copolymerizable monomers in an aqueous emulsion to form polymeric materials having more or less rubbery properties depending upon the proportion of conjugated diene and the type of comonomers. The plasticities of these polymeric materials, as measured on the Mooney ML-4 scale, can be controlled by the use of modifying materials. In these methods of the prior art, the inherent viscosity (defined below) varies through the conversion range indicating that the final product is composed of a mixture of polymers having a wide variation in molecular weight. These systems when taken to high conversion are generally accompanied by the formation of a relatively large amount of gel.

Inherent viscosity as used in this disclosure is determined by putting the polymer in benzene solution and the inherent viscosity "N" is defined:

$$N = \frac{\ln \frac{t}{t_0}}{C}$$

where $t$ is time of flow of a solution of the polymer through an orifice and $t_0$ is time of flow of the solvent under identical conditions and $C$ is the concentration of polymer in grams per 100 ml. of solvent. Inherent viscosity is a measurement only on the soluble portion of the polymeric material.

In a polymerization system wherein the inherent viscosity remains substantially constant throughout the range, the resulting polymer will have a more uniform molecular weight distribution than would the normal or prior art polymer. When polymerization can be carried to substantially quantitative conversion, as can be done by the process of this invention, the steps of stripping and recovery of unreacted monomers are considerably simplified. The gel-free polymers produced by the method of this invention are more easily processed than are those polymers containing substantial amounts of gel. The products of this invention, being substantially gel free, are substantially completely soluble in organic solvents. Such solutions of rubber can be treated with various reagents such as hydrogen or halogen to yield valuable products. They can also be used in adhesives, cement and coating compositions. These high inherent rubbery polymers are also particularly adaptable to oil extension.

An object of this invention is to provide a method of preparing polymers having substantially constant inherent viscosities throughout the conversion range above 30 percent conversion.

Another object of this invention is to provide an aqueous emulsion polymerization system wherein the polymer contained in the resulting latex is substantially gel free.

Still other objects and advantages of this invention will be apparent to those skilled in the art having been given this disclosure.

This invention comprises polymerizing monomers comprising at least 20 weight percent conjugated diene in the presence of both a mercaptan and an aromatic nitro compound.

Polymers prepared in accordance with this invention are homopolymers and copolymers of conjugated dienes with the amount of conjugated diene being in the range of 20 to 100 parts by weight per 100 parts total monomeric material and most frequently the conjugated diene will comprise at least 50 weight percent of the total monomers. Any monomeric material known to be copolymerizable with conjugated dienes in aqueous emulsion systems is applicable in this invention. Mixtures of conjugated dienes with each other or with other copolymerizable materials are applicable, it only being necessary that the total conjugated diene comprise at least 20 weight parts per 100 parts total monomers. It should be understood that the term copolymer is broad and includes the polymeric material resulting from polymerizing together two or more kinds of monomers.

The conjugated dienes most frequently used are those conjugated dienes containing 4 to 12 carbon atoms per molecule. By the way of example the following conjugated dienes can be mentioned: 1,3-butadiene, 2,3-dimethyl-1, 3-butadiene, 2-phenyl-3-ethyl-1,3-butadiene, 2,3-dipropyl - 1,3 -butadiene, isoprene, piperylene, 3 -furyl-1,3 - butadiene, 2 -methoxy - 1,3 - butadiene, chloroprene, bromoprene, methylchloroprene and the like. Of the conjugated dienes known to be polymerizable in an aqueous emulsion system, 1,3-butadiene is most frequently preferred due to its availability and the superior physical properties of the polymer prepared from butadiene.

Monomers most frequently copolymerized with the conjugated dienes when rubbery copolymers are desired are those monomers having a $CH_2=C<$ group and includes aryl olefins; acrylic and substituted acrylic acids and their esters; vinyl ethers; vinyl ketones; unsaturated nitriles; and unsaturated amides. Examples of such copolymerizable monomers include styrene, various alkyl styrenes, p - chlorostyrene, p - methoxystyrene, alpha-methylstyrene, vinylnaphthalene, acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide, methyl isopropenyl ketone, methyl vinyl ketone, methyl vinyl ether, vinyl chloride, vinylidene chloride, vinylfurane, vinylcarbazole, vinylacetylene and the like. The copolymer of a major portion of 1,3-butadiene and a minor portion of styrene has been widely used in commerce and is a preferred copolymer of this invention.

The conjugated dienes can also be copolymerized with a monomer containing a heterocyclic nitrogen base of the pyridine or quinoline series. The copolymer of such a conjugated diene and a heterocyclic nitrogen base is more or less resinous depending upon the percent heterocyclic nitrogen base in the copolymer. Such copolymers can be quaternized by the use of known quaternizing agents. Some examples of suitable heterocyclic nitrogen containing bases include 2-vinylpyridine, 3-vinylpyridine, 4-vinylpyridine, 2,4,6-trimethyl-3-vinylpyridine, 3,4,5,6-tetramethyl - 2 - vinylpyridine, 3 - ethyl - 5 - vinylpyridine, 2 -methyl - 5 - vinylpyridine, 2,6 -diethyl - 4 - vinylpyridine, 2 - isopropyl - 4 - nonyl - 5 - vinylpyridine, 2-methyl - 5 - undecyl - 6 - vinylpyridine and similar quinolines.

The monomers are polymerized according to this invention by any of the well known aqueous emulsion polymerization systems, i.e., iron pyrophosphate, and polyalkalene polyamine emulsion polymerization systems. Recipes for these systems are well known in the art and our invention is directed to the combination of a modifier and a nitroaromatic compound in the polymerization system. The polymerization can be carried out under any polymerization conditions as taught by the art, e.g. —40 to 70° C. generally under sufficient pressure to maintain the reactants substantially in the liquid phase. This invention is particularly useful in the iron pyrophosphate recipe, e.g., an emulsion polymerization utilizing iron pyrophosphate as an activator, at temperatures of 20° C. and lower.

As has been said, the process of this invention comprises carrying out the polymerization in the presence of both a mercaptan and an aromatic nitro compound. In general a mercaptan can be used in the range of 0.03 to 3 weight percent based on the total monomers and more generally in the range of 0.03 to 1 weight percent is used. The aromatic nitro compound is generally used in the range of 0.03 to 0.5 weight percent based on total monomers and more frequently 0.03 to 0.25 weight percent gives satisfactory results.

Any of the mercaptans known to be modifiers in emulsion polymerization system are applicable in our invention. Those most frequently preferred are the aliphatic mercaptans and we have found that the aliphatic $C_{12}$ to $C_{16}$ mercaptans are especially useful. These mercaptans can be primary, secondary or tertiary and most frequently the tertiary aliphatic $C_{12}$ to $C_{14}$ mercaptans are used.

The aromatic nitro compounds which are useful are preferably those having only one nitro substituent. The nitro compounds can contain inert groups such as alkyl, cycloalkyl, alkoxy, halo group etc. The organic substituents should contain not more than 12 carbon atoms. Also the polyaromatic compounds are applicable. Examples of such mono-nitro aromatic compounds include nitrobenzene, 1-chloro-2-nitrobenzene, 1-chloro-4-nitrobenzene, 1-bromo-4-nitrobenzene, 3-nitrotoluene, 3-ethylnitrobenzene, 2-ethyl-4-propylnitrobenzene, 2,3,4-tripropylnitrobenzene, 3 - methoxy - 5 - nitrotoluene, 3-butyl-5-ethoxynitrobenzene, 2-nitro-5-chlorotoluene, 4-t-dodecylnitrobenzene, 3-cyclopentylnitrobenzene, alkyl esters of nitrobenzoic acids such as the methyl, ethyl, and propyl esters, alkyl esters of nitrobenzenesulfonic acids and similarly substituted polyaromatic nitro compounds such as naphthalenes and biphenyls.

Polynitro-aromatic compounds are relatively strong inhibitors and are less desirable than are the mononitroaromatic compound. On the other hand, such compounds can be used. Examples of these compounds include 1-bromo-2, 4-dinitrobenzene, 1-chloro-2, 4-dinitrobenzene, 2-chloro-1, 3-dinitrobenzene, 2-bromo-1, 3-dinitrobenzene, 2,4-dinitroaniline, dinitro-o-cresol, 2,4-dinitroaniline, 2,4-dinitrotoluene, picric acid and the like.

Similarly nitrophenols are operable but due to their strong inhibiting power are less preferred than are the nitroaromatic compounds indicated. Examples of such nitrophenols include o-nitrophenol, 2,4-dinitrophenol, 3-nitro-4-chlorophenol, 3-nitro-4-propylphenol and the like.

It is known that aromatic nitro compounds behave as retarders for polymerizations. Mercaptans are widely used as polymerization modifiers. When aromatic nitro compounds are used in recipes which do not contain modifiers, the total conversion obtainable is relatively low and considerable gel is formed at conversions above about 50 percent. When mercaptans are used as modifiers in the absence of any nitroaromatic compound in a given polymerization system, the inherent viscosity of the polymer is generally fairly low during the early stages of polymer formation but increases rapidly until a maximum is reached, after which there is an abrupt decrease in the values. This is particularly true of the primary alkyl mercaptans and certain tert-alkyl mercaptans for example the tert-octyl and tert-dodecyl mercaptans. Run 1 of Example I was not sampled until the conversion had neared 36% and a large amount of gel had already formed, however, this rise and fall is shown in run 3 of Example II. It is believed that this sudden decrease in inherent viscosity is due to gel formation and, as has been indicated, the inherent viscosity is dependent upon soluble polymer only. When relatively small amounts of mercaptan are used in a polymerization reaction, e.g., quantities ordinarily used to give a processable rubbery polymer, the formation of gel frequently occurs as polymerization continues and is particularly pronounced at conversion levels above 60 or 70 percent. It is difficult to obtain gel-free rubbery polymers at high conversions when mercaptans are used as the sole modifiers for the polymerizations. When using the combination of an aromatic nitro compound and a mercaptan as the modifying agent, as herein described, gel-free rubbery polymers are readily obtained at high conversions. In addition to the low gel content, there is little variation in the inherent viscosity of the products formed from around 30 percent to approximately quantitative conversion. Each sample was milled three passes to mass the microgel to facilitate its measurement.

The advantages of this invention can best be illustrated by the following examples. The polymerization recipes used are typical 41° F. iron pyrophosphate recipes for copolymerizing butadiene and styrene to form a rubbery polymer.

*Example I*

The following recipe was employed for making a series of runs for the copolymerization of butadiene with styrene at 41° F.

| | Parts by weight |
|---|---|
| Butadiene | 70 |
| Styrene | 30 |
| Water | 200 |
| Potassium fatty acid soap | 6 |
| Nitrobenzene | Variable |
| $K_4P_2O_7$ | 0.165 |
| $FeSO_4.7H_2O$ | 0.139 |
| KCl | 0.30 |
| tert-Butylisopropylbenzene hydroperoxide | 0.104 |
| tert-Dodecyl mercaptan | Variable |

Results were as follows:

| Run | Nitrobenzene, Part | tert-$C^{12}$ Mercaptan, Part | Time, Hours | Conversion, Percent | Milled 3 Passes | |
|---|---|---|---|---|---|---|
| | | | | | Inherent Viscosity | Gel, Percent |
| 1 | 0.000 | 0.085 | 1.0 | 36 | 2.44 | 27 |
| | 0.000 | 0.085 | 2.8 | 80 | 1.83 | 52 |
| | 0.000 | 0.085 | 5.6 | 94 | 1.34 | 76 |
| | 0.000 | 0.085 | 12.6 | 97 | 1.10 | 59 |
| | 0.000 | 0.085 | 22.0 | 98 | 1.82 | 82 |
| 2 | 0.062 | 0.085 | 1.0 | 15 | 2.73 | 0 |
| | 0.062 | 0.085 | 2.8 | 32 | 3.39 | 4 |
| | 0.062 | 0.085 | 5.6 | 56 | 3.11 | 4 |
| | 0.062 | 0.085 | 12.6 | 80 | 2.59 | 16 |
| | 0.062 | 0.085 | 22.0 | 88 | 2.12 | 16 |
| 3 | 0.062 | 0.100 | 1.0 | 16 | 2.98 | 0 |
| | 0.062 | 0.100 | 2.8 | 31 | 3.21 | 4 |
| | 0.062 | 0.100 | 5.6 | 56 | 3.14 | 6 |
| | 0.062 | 0.100 | 12.6 | 81 | 2.44 | 19 |
| | 0.062 | 0.100 | 22.0 | 90 | 2.17 | 26 |
| 4 | 0.062 | 0.125 | 1.0 | 17 | 3.02 | 0 |
| | 0.062 | 0.125 | 2.8 | 32 | 3.29 | 1 |
| | 0.062 | 0.125 | 5.6 | 59 | 3.14 | 1 |
| | 0.062 | 0.125 | 12.6 | 85 | 2.58 | 3 |
| | 0.062 | 0.125 | 22.0 | 93 | 2.23 | 9 |
| 5 | 0.062 | 0.170 | 1.0 | 16 | 3.09 | 0 |
| | 0.062 | 0.170 | 2.8 | 34 | 3.34 | 0 |
| | 0.062 | 0.170 | 5.6 | 58 | 3.41 | 0 |
| | 0.062 | 0.170 | 12.6 | 84 | 2.70 | 1 |
| | 0.062 | 0.170 | 22.0 | 95 | 2.23 | 2 |

| Run | Nitro-benzene, Part | tert-C12 Mercaptan, Part | Time, Hours | Conversion, Percent | Milled 3 Passes | |
|---|---|---|---|---|---|---|
| | | | | | Inherent Viscosity | Gel, Percent |
| 6 | 0.124 | 0.085 | 1.0 | 14 | 3.77 | 0 |
| | 0.124 | 0.085 | 2.7 | 27 | 4.04 | 0 |
| | 0.124 | 0.085 | 5.0 | 42 | 4.01 | 0 |
| | 0.124 | 0.085 | 9.0 | 62 | 3.62 | 0 |
| | 0.124 | 0.085 | 21.2 | 84 | 2.73 | 2 |
| | 0.124 | 0.085 | 28.5 | 91 | 2.49 | 2 |
| 7 | 0.124 | 0.100 | 1.0 | 13 | 3.46 | 0 |
| | 0.124 | 0.100 | 2.7 | 27 | 3.92 | 0 |
| | 0.124 | 0.100 | 5.0 | 40 | 3.94 | 0 |
| | 0.124 | 0.100 | 9.0 | 61 | 3.50 | 0 |
| | 0.124 | 0.100 | 21.2 | 85 | 3.04 | 0 |
| | 0.124 | 0.100 | 28.5 | 93 | 2.69 | 0 |
| 8 | 0.124 | 0.125 | 1.0 | 14 | 3.25 | 0 |
| | 0.124 | 0.125 | 2.7 | 27 | 3.47 | 0 |
| | 0.124 | 0.125 | 5.0 | 40 | 3.43 | 0 |
| | 0.124 | 0.125 | 9.0 | 62 | 3.29 | 0 |
| | 0.124 | 0.125 | 21.2 | 85 | 3.10 | 0 |
| | 0.124 | 0.125 | 28.5 | 89 | 2.84 | 0 |
| 9 | 0.124 | 0.150 | 1.0 | 14 | 3.20 | 0 |
| | 0.124 | 0.150 | 2.7 | 27 | 3.30 | 0 |
| | 0.124 | 0.150 | 5.0 | 41 | 3.11 | 0 |
| | 0.124 | 0.150 | 9.0 | 61 | 3.06 | 0 |
| | 0.124 | 0.150 | 21.2 | 85 | 3.05 | 0 |
| | 0.124 | 0.150 | 28.5 | 91 | 2.92 | 0 |
| 10 | 0.124 | 0.170 | 1.0 | 13 | 3.18 | 0 |
| | 0.124 | 0.170 | 2.7 | 28 | 3.39 | 0 |
| | 0.124 | 0.170 | 5.0 | 42 | 2.84 | 0 |
| | 0.124 | 0.170 | 9.0 | 61 | 2.92 | 0 |
| | 0.124 | 0.170 | 21.2 | 85 | 3.05 | 0 |
| | 0.124 | 0.170 | 28.5 | 88 | 2.93 | 0 |

From the above data, it can be seen that the use of both an aromatic nitro compound and a mercaptan materially reduces the gel content at the higher conversions. For example, in run 1 in which no nitrobenzene is used, the gel content at 80 percent conversion is 52 percent. In run 2, using the same amount of mercaptan but also using a small amount of nitrobenzene, the gel content at 80 percent conversion is only 16 percent. In run 5, using the same amount of nitrobenzene but twice on such mercaptan the gel content at 80 percent conversion is only 1 percent. In run 6, the smaller amount of mercaptan is used, and twice as much nitrobenzene is used. Here again, the gel content is less than 2 percent at 80 percent conversion. In run 10, where the larger amounts of both modifiers is used, there is no gel at the 80 percent conversion level.

Another comparison which can be made is the variation in inherent viscosity throughout the conversion range above 30 percent conversion. In run 1 the inherent viscosity in the specified conversion range varied from 1.10 to 2.44 or 122 percent over the minimum. In run 2 the variation is from 2.12 to 3.39 or 60 percent. It should also be noticed that these viscosities are also considerably higher in run 2 than they were in run 1. In run 5 the variation is from 2.23 to 3.41 or 53 percent. In run 6 the inherent viscosity varies from 2.49 to 4.01 or 61 percent while in run 10 the variation is from 2.84 to 3.05 or 7.4 percent. When the variation of run 2 Example II which varied from 2.42 to 2.67 or 10.3 percent is compared with these data it is surprising to find that on doubling the mercaptan (run 5 as compared to run 2) the ultimate conversion is considerably increased without decreasing the average inherent viscosity and without substantially increasing the inherent viscosity variation. These comparisons of inherent viscosities are more clearly shown in conjunction with Example II.

*Example II*

A series of runs was made for the copolymerization of butadiene with styrene in aqueous emulsion at 41° F. The runs were made in accordance with the following recipe:

| | Parts by weight |
|---|---|
| Butadiene | 70 |
| Styrene | 30 |
| Water | 200 |
| Potassium fatty acid soap | 6 |
| Nitrobenzene | 0 or 0.05 |
| $K_4P_2O_7$ | 0.165 |
| $Na_4P_2O_7 \cdot 10H_2O$ | 0.223 |
| $FeSO_4 \cdot 7H_2O$ | 0.278 |
| KCl | 0.30 |
| tert-Butylisopropylbenzene hydroperoxide | 0.208 |
| tert-Dodecyl mercaptan | 0 or 0.085 |

| Run | Nitro-benzene, Part | tert-C12 Mercaptan, Part | Time, Hours | Conversion, Percent | Milled 3 Passes | |
|---|---|---|---|---|---|---|
| | | | | | Inherent Viscosity | Gel, Percent |
| 1 | | | 0.3 | 27 | 1.88 | 0 |
| | | | 0.8 | 50 | 2.21 | 16 |
| | | | 1.4 | 72 | 1.80 | 40 |
| | | | 3.9 | 92 | 1.64 | 70 |
| 2 | 0.05 | | 0.5 | 22 | 1.60 | 0 |
| | 0.05 | | 1.0 | 26 | 1.95 | 0 |
| | 0.05 | | 1.6 | 28 | 2.31 | 0 |
| | 0.05 | | 3.4 | 33 | 2.52 | 0 |
| | 0.05 | | 6.1 | 39 | 2.56 | 4 |
| | 0.05 | | 11.3 | 53 | 2.67 | 21 |
| | 0.05 | | 23.7 | 73 | 2.46 | 40 |
| | 0.05 | | 47.2 | 78 | 2.42 | 39 |
| 3 | | 0.085 | 0.2 | 27 | 1.59 | 0 |
| | | 0.085 | 0.5 | 42 | 2.38 | 0 |
| | | 0.085 | 0.7 | 46 | 2.59 | 2 |
| | | 0.085 | 1.2 | 66 | 2.58 | 17 |
| | | 0.085 | 1.6 | 80 | 2.19 | 33 |
| | | 0.085 | 3.4 | 94 | 1.85 | 38 |
| 4 | 0.05 | 0.085 | 0.5 | 24 | 1.72 | 0 |
| | 0.05 | 0.085 | 0.9 | 25 | 1.91 | 0 |
| | 0.05 | 0.085 | 1.5 | 28 | 2.23 | 0 |
| | 0.05 | 0.085 | 3.4 | 33 | 2.68 | 0 |
| | 0.05 | 0.085 | 6.0 | 42 | 2.90 | 0 |
| | 0.05 | 0.085 | 11.2 | 61 | 2.92 | 0 |
| | 0.05 | 0.085 | 23.7 | 83 | 2.82 | 0 |
| | 0.05 | 0.085 | 47.3 | 93 | 2.79 | 0 |

The above data have been plotted in the attached drawing. The various graphs are numbered according to the run number above. While the curve representing run 2 is as flat as the curve representing run 4, it should be noted that even after 47 hours, only 78 percent conversion was obtained in run 2 whereas 93 percent conversion was obtained in run 4. The gel contents in the runs using no modifier or either modifier alone were relatively high at the end of the conversion periods while no gel was formed in run 4.

*Example III*

Two 70/30 butadiene/styrene copolymers were prepared by emulsion polymerization at 41° F. using recipes that gave approximately the same reaction rate. In one run 0.05 part nitrobenzene was present. The recipes were as follows:

| | Parts by Weight | |
|---|---|---|
| | 1 | 2 |
| Butadiene | 70 | 70 |
| Styrene | 30 | 30 |
| Water | 200 | 200 |
| Potassium fatty acid soap | 6 | 6 |
| Nitrobenzene | 0.05 | |
| $K_4P_2O_8$ | 0.330 | 0.049 |
| $FeSO_4 \cdot 7H_2O$ | 0.278 | 0.042 |
| KCl | 0.30 | 0.30 |
| tert-Butylisopropylbenzene hydroperoxide | 0.208 | 0.031 |
| tert-Dodecyl mercaptan | 0.80 | 0.55 |

The following polymerization results were obtained:

| | Time, Hours | Conversion, Percent | ML-4 |
|---|---|---|---|
| Recipe 1 | 14.9 | 96 | 52 |
| Recipe 2 | 19.2 | 92 | 60 |

Samples of the two elastomers were compounded in accordance with the following tread recipe:

| | Parts by weight |
|---|---|
| Elastomer | 100 |
| Carbon black (Philblack O) | 50 |
| Zinc oxide | 3 |
| Sulfur | 1.75 |
| Stearic acid | 1 |
| Flexamine [1] | 1 |
| Santocure [2] | 0.9 |

[1] Physical mixture containing 65 percent of a complex diarylamine-ketone reaction product and 35 percent of N,N'-diphenyl-p-phenylenediamine.
[2] N-cyclohexyl-2-benzothiazylsufenamide.

The stocks were milled, cured 30 minutes at 307° F. and physical properties determined. The following results were obtained:

| | 1 | 2 |
|---|---|---|
| Unaged Samples: | | |
| Compression set, percent | 18.7 | 18.2 |
| 300 Percent modulus, p.s.i., 80° F | 1,660 | 1,520 |
| Tensile, p.s.i., 80 F | 3,220 | 2,760 |
| Elongation, percent, 80 F | 480 | 360 |
| $\Delta$T F | 77.7 | 73.6 |
| Resilience, percent | 56.8 | 59.6 |
| Flex life, thousands of flexures to failure | 4.6 | 6.0 |
| Shore hardness | 56 | 54 |
| Abrasion loss, grams, 35 minutes cure | 6.17 | 6.64 |
| Compounded MS 1½ at 212 F | 38 | 35.5 |
| Oven Aged 24 Hours at 212 F: | | |
| Tensile, p.s.i., 80 F | 3,630 | 2,020 |
| Elongation, percent, 80 F | 360 | 260 |
| $\Delta$T F | 64.2 | 63.5 |
| Resilience, percent | 61.6 | 63.4 |
| Flex life, thousands of flexures to failure | 6.9 | 5.9 |
| Shore hardness | 61.5 | 60 |
| Abrasion loss, grams, 35 minutes cure | 4.60 | 5.63 |

The above data clearly shows the superior properties of the polymer prepared with nitrobenzene plus mercaptan over that prepared with mercaptan only. For example, the unaged tensile (p.s.i. at 80° F.) is somewhat improved and the aged tensile is very markedly improved. The elongation and abrasion loss is considerably better in the polymer prepared by the invention than it is in the polymer prepared by the conventional recipe. The remaining physical properties are either superior to or comparable to that prepared by the conventional method.

In order to compare the method of the invention with the method of the prior art, the invention was illustrated using a 70/30 butadiene/styrene copolymer prepared in a 41° F. aqueous emulsion polymerization system. The aromatic nitro compound and the mercaptan in all cases was the same. It should be understood that any of the aromatic nitro compounds as disclosed and any of the mercaptans as disclosed are applicable to aqueous emulsion polymerization of any of monomers as disclosed.

We claim:

1. In the aqueous emulsion polymerization process wherein copolymerizable monomers comprising at least 20 weight percent conjugated dienes, the remaining monomer being a copolymerizable monomer containing a $CH_2=C<$ group, are being polymerized, the improvement comprising carrying out said polymerization in the presence of both a mercaptan modifier and a compound selected from the group consisting of mono-, di- and trinitroaromatic compounds wherein the aromatic compound is selected from the group consisting of mono- and binuclear carbocyclic structures containing as ring substituents said nitro groups and radicals selected from the group consisting of hydrogen, alkyl, cycloalkyl, alkoxy and halogen attached to carbon atoms of said carbocyclic structures and wherein the total number of carbon atoms in any organic substituent does not exceed 12.

2. A process for forming low gel and substantially constant inherent viscosity polymers above 30 percent conversion, the said process comprising emulsifying copolymerizable monomers comprising at least 20 weight percent conjugated dienes, the remaining monomer being a copolymerizable monomer containing a $CH_2=C<$ group, in an aqueous medium and polymerizing said monomers to at least 30 percent conversion in the presence of both 0.03 to 3 weight percent, based on total monomers, of a mercaptan and 0.03 to 0.5 weight percent, based on total monomer, of a compound selected from the group consisting of mono-, di- and trinitroaromatic compounds wherein the aromatic compound is selected from the group consisting of mono- and binuclear carbocyclic structures containing as ring substituents said nitro groups and radicals selected from the group consisting of hydrogen, alkyl, cycloalkyl, alkoxy and halogen attached to carbon atoms of said carbocyclic structure and wherein the total number of carbon atoms in any organic substituent does not exceed 12.

3. A process for forming low gel polymers which have a substantially constant inherent viscosity throughout the conversion range from 30 percent conversion to above 80 percent conversion which comprises emulsifying a conjugated diene in an aqueous medium and polymerizing said conjugated diene in aqueous medium at a temperature in the range —40° to 20° C. and in the presence of both 0.03 to 3 weight percent, based on total monomers, of an aliphatic mercaptan and 0.03 to 0.5 weight percent, based on total monomer, of a compound selected from the group consisting of mono- and binuclear carbocyclic structures containing as ring substituents at least one and not more than three nitro groups and radicals selected from the group consisting of hydrogen, alkyl, cycloalkyl, alkoxy and halogen attached to carbon atoms of said carbocyclic structures and wherein the total number of carbon atoms in any organic substituent does not exceed 12.

4. A process for forming a low gel polymer of improved polymer size distribution, said process comprising emulsifying a conjugated diene in an aqueous emulsion, polymerizing said conjugated diene at a temperature no higher than 20° C. in the presence of an iron pyrophosphate activator and in the presence of both an aliphatic $C_{12}$ to $C_{16}$ mercaptan and a benzene ring compound having at least one and not more than three nitro substituents on a carbon atom of said benzene ring.

5. The process of claim 4, wherein the benzene ring compound is present at a concentration in the range 0.03 and 0.25 weight percent based on polymerizable monomers and the aliphatic mercaptan is present at a concentration in the range 0.03 to 1 weight percent based on polymerizable monomers.

6. A polymerization process comprising emulsifying copolymerizable monomers comprising at least 50 weight percent conjugated diene, the remaining monomer being a copolymerizible monomer containing a $CH_2=C<$ group, in aqueous emulsion, polymerizing said monomers in said aqueous medium in the presence of an iron pyrophosphate activator at a temperature in the range —40° C. to 20° C. and in the presence of 0.03 to 1 weight percent, based on total monomers, of an aliphatic mercaptain selected from the group consisting of primary, secondary and tertiary aliphatic mercaptans containing 12 to 16 carbon atoms per molecule and 0.03 to 0.25 weight percent, based on total monomers, of a compound selected from the group consisting of mono- and di- and trinitroaromatic compounds wherein the aromatic compound is selected from the group consisting of mono- and binuclear carbocyclic structures containing as ring substituents said nitro groups and radicals selected from the group consisting of hydrogen, alkyl, cycloalkyl, alkoxy and halogen attached to carbon atoms of said carbocyclic structures and wherein the total number of carbon atoms in any organic substituent does not exceed 12.

7. The process of claim 6 wherein the conjugated diene is 1,3-butadiene.

8. The process of claim 6 wherein the monomers consist of a major proportion of 1,3-butadiene and a minor proportion of styrene.

9. The process of claim 8 wherein the mercaptan is a tertiary $C_{12}$ mercaptan and the compound containing the nitro substituent is mononitrobenzene.

10. The process of claim 9 wherein the monomers consist of 70 weight percent 1,3-butadiene and 30 weight percent styrene, the polymerization temperature is 50° C. and the mercaptan is tert-dodecyl mercaptan.

References Cited in the file of this patent

UNITED STATES PATENTS

| | | |
|---|---|---|
| 2,344,489 | Boyer et al. | Mar. 21, 1944 |
| 2,388,514 | Zwicker et al. | Nov. 6, 1945 |
| 2,450,272 | Doelling et al. | Sept. 28, 1948 |
| 2,481,044 | Scott | Sept. 6, 1949 |
| 2,640,821 | Pritchard et al. | June 2, 1953 |
| 2,686,165 | Fryling et al. | Aug. 10, 1954 |
| 2,718,530 | Conner | Sept. 20, 1955 |